United States Patent [19]

Mathamel

[11] Patent Number: 4,628,325
[45] Date of Patent: Dec. 9, 1986

[54] ELECTROMAGNETIC INTERFERENCE SUPPRESION FOR ELECTRICAL DISCHARGE PRINTERS

[75] Inventor: Flavius A. Mathamel, Dearborn Heights, Mich.

[73] Assignee: Burroughs Corporation, Detroit, Mich.

[21] Appl. No.: 583,634

[22] Filed: Feb. 27, 1984

[51] Int. Cl.$^4$ .................. G01D 15/08; B32B 3/00
[52] U.S. Cl. .................. 346/1.1; 346/135.1; 346/162; 346/163; 346/165; 204/2; 428/209
[58] Field of Search .................. 346/1.1, 135.1, 153.1, 346/162, 163, 165; 358/300; 428/209; 427/121, 186, 188; 219/384; 204/2, 129.1; 361/304; 400/120

[56] References Cited

U.S. PATENT DOCUMENTS 3,233,244  2/1966  Winterhalter .................. 346/165 X
3,491,344  1/1970  Ferber .

OTHER PUBLICATIONS

Berry et al, "Improved Grounding for Electroerosion Printer, IBM Tech. Disc. Bul. vol. 25, No. 12, p. 6565, May '83.
Berry et al, "Electromagnetic Interference Shielding", IBM Tech. Disc. Bul. vol. 26, No. 7A, p. 3134, Dec. '83.
Christensen, "Fabrication of Capacitors", IBM Tech. Disc. Bul., vol. 9, No. 8, p. 977, Jan. '67.

*Primary Examiner*—Joseph W. Hartary
*Attorney, Agent, or Firm*—Mark T. Starr

[57] ABSTRACT

Disclosed is a system and method for reducing the level of electromagnetic emission radiated by electrical discharge type printers. Such printers utilize one or more styluses which are scanned across the width of a roll of electrosensitive paper and are selectively energized to vaporize small areas on the paper's coating to thereby form characters. When the coating vaporizes, a spark is produced which generates a broad band of electromagnetic energy which is conducted into the environment due to the conductive coating of the previously printed paper acting as an antenna.

In order to reduce the effective antenna length and/or propagation capability to thereby reduce the energy radiated, the present system creates isolation bands at preset intervals as the printing occurs. The isolation bands are produced by continuously energizing all styluses as they scan across the full width of the paper, thereby causing an entire band of the paper's conductive coating to be burned off across the entire width of the paper. Each isolation band severs the conductive surface of the paper, thereby reducing the effective length and/or propagation capability of the antenna created by the printed paper and lowering the level of radiated energy.

35 Claims, 6 Drawing Figures

ELECTROMAGNETIC INTERFERENCE SUPPRESION FOR ELECTRICAL DISCHARGE PRINTERS

BACKGROUND OF THE INVENTION

The present invention relates in general to an apparatus and method for suppressing electromagnetic emissions from computer equipment. More particularly, the present invention relates to an apparatus and method for suppressing electromagnetic emissions generated by the operation of electrical discharge type printers.

Electrical discharge printers are well known in the prior art. Typically, such printers provide many performance characteristics of complex and costly high speed printers at a price below low speed models. Such printers allow printing speeds above one thousand characters per second on electrosensitive paper. Typical examples of such electrical discharge printers are the models 1110 and 1180 produced by SCI Systems, Inc.

Electrical discharge printers find application in many modern computer systems requiring a low cost, high speed output device. A typical application of such a printer would be its use in conjunction with a document processor such as a Burroughs S3000 system, which reads printed information on checks and sorts the checks into a plurality of pockets based on the information read. When a pocket has been filled with checks, it is desirable to have a printed record of pertinent information on the checks in the filled pocket. Thus, after the pocket has been filled with checks, the printer produces a printed record describing the data on the checks in the pocket.

Electrical discharge printers utilize a spark mechanism in order to accomplish printing on electrosensitive paper. The sparks produced are characterized as having a very sharp rise time and result in a multitude of discharges being generated. These discharges generate a broad band of frequency which is generated through all of the surrounding medium right in the area of the printer and thus induces energy in the surrounding medium. In a typical electrical discharge printer, the nearest medium to the printer is the previously printed electrosensitive paper itself. The energy generated by the electrical discharges is thus coupled into the metallized coating of the electrosensitive paper and once on the coating, the paper acts as an antenna because of its conductive coating. The energy radiates along the surface of the paper, out of the machine and right into the open air.

The Federal Communications Commissions rules impose limitations on the levels of radio frequency energy that may be generated by computer equipment. The purpose of these rules is to assure that computer equipment does not generate energy which can interfere with radio communications.

As used in prior art systems, the electrosensitive paper fed out from the printer provides a continuous (but not perfect) conductor. Thus, the paper acts as a relatively good antenna.

In the prior art, several techniques have been utilized or proposed for suppressing the antenna effect created by the ejected length of electrosensitive paper which is produced as the printing operation occurs.

One prior art technique involves placing the printer and the printed paper output in a shielded EMI enclosure. This technique does not eliminate the radiated energy, but contains it within the shielded container. This technique of containing the electromagnetic radiation is quite effective. However, the cost of providing such an enclosure and the inconvenience to the operator make this technique undesirable. Thus, after a length of paper has been printed and is to be removed from the printer, the operator must open a drawer or other mechanism to remove the printout and thereafter close the drawer and latch any interlock provided prior to starting operation again.

Another prior art technique of reducing the antenna effect of the printed paper is to cut the length of paper output at predetermined intervals. This effectively shortens the length of the antenna and thereby reduces the amount of electromagnetic radiation generated. This technique suffers from the fact that the paper may have to be cut at an interval which is shorter than the length required to contain a single printout for a full pocket. For example, in the Burroughs S3000 document processor, a full pocket of documents contain approximately 300 checks. A single printout of data corresponding to the 300 checks would be too long to produce without the paper producing undesirable antenna effects. Thus, the length of paper corresponding to the printout for the 300 checks would have to be cut at one or more places. This is undesirable.

Other techniques used to suppress EMI in electrical discharge printers involve various combinations of grounding the electrosensitive paper with wipers and placing the printer in a metallized enclosure. Providing grounding wipers affects the reliability of the printer's paper feed mechanism and results in the requirement of considerable maintenance in order to maintain the EMI suppression. Therefore, such techniques are both unreliable and expensive.

It is the general object of the present invention to overcome these and other drawbacks of the prior art by providing a method and apparatus for electromagnetic interference suppression in electrical discharge printers.

It is a further object of the present invention to provide an appartus and method which effectively reduces the radiation level produced by the printed electrosensitive paper from an electrical discharge printer.

It is another object of the present invention to provide a low cost method of modifying electical discharge printers in order to reduce electromagnetic energy generated by the operation of such printers.

It is still another object of the present invention to provide a method of operating an electrical discharge printer whereby electromagnetic interference generated by the printer is suppressed without the need of enclosing the printer or printed output in a shielded container.

It is an additional object of the present invention to reduce the electromagnetic energy radiated via the printed electrosensitive paper output by an electrical discharge printer without the need to cut the paper at predetermined intervals.

It is still a further object of the present invention to provide a method of reducing radio frequency energy generated by an electrical discharge printer to levels below the maximums permitted by regulatory agencies such as the Federal Communications Commission (FCC).

These and other objects, features and advantages of the present invention will become more apparent from the detailed description of the preferred embodiment when read in connection with the drawings.

SUMMARY OF THE INVENTION

According to the invention, a system and method are provided for reducing electromagnetic interference generated by the operation of electrical discharge type printers.

Electrical discharge printers typically incorporate a plurality of wipers (or styli) spaced very close together vertically, the distance between the uppermost and the lowest stylus corresponding to the width (or height) of the characters to be printed. The styli are physically moved across the entire width of a roll of electrosensitive paper. Each stylus is pulsed with a voltage at each point where a dot is to be printed. When a stylus is energized, a spark is created when the metallization on the electrosensitive paper is burned away. By selectively activating each of the plurality of styluses as the styli scan across the width of the paper, an entire column (or row) of characters is printed by the technique common to matrix printers. As the length of paper printed increases, a longer and longer antenna is formed which radiates electromagnetic energy into the surrounding air. While many factors determine the level of free space radiated energy produced by an energized antenna, experimental tests have established that the radiation levels increase directly with increased paper length in this printer application.

The present invention assures that the effective length of the antenna formed by the printed electrosensitive paper remains short, thereby reducing the amount of electromagnetic radiation emitted into the surrounding air. In order to obtain a shortened effective antenna length, the present invention creates EMI isolation bands at preset intervals as the printing occurs. In order to create an isolation band, all styli are energized to produce a continuous stripe across the entire width of the paper. Thus, since all styli are continuously energized, an entire band of the metallized surface of the electrosensitive paper is burned off across the entire width of the paper. This isolation band interrupts the conductive surface of the electrosensitive paper, thereby effectively serving the same function as if the paper were physically cut. That is, the effective length of the printed paper is electrically reduced by breaking its conductive surface, thereby reducing the effective length of the antenna created by the printed paper.

The frequency of the isolation bands is dependent on the amount of reduction in radiated energy desired. Thus, the more frequently the isolation bands are produced, the shorter the antenna length, and the lower the level of radiated energy.

As an alternative to the preferred method, multiple isolation bands, each one adjacent to the previous one, may be produced. By increasing the number of consecutive isolation bands, the distance between groups of isolation bands can be increased without significant increase in the amount of radiation radiated from the printed paper.

In addition to teaching the method of reducing EMI, the present invention teaches a control circuit for producing the isolation bands. The control circuit is responsive to the number of columns (or rows) printed. After determining that a preset number of columns has been printed, the control circuit halts the receipt of data and signals the printer to print one or more isolation bands. Thereafter, the control circuit restarts the printing of data.

BRIEF DESCRIPTION OF THE DRAWING

FIG. 3 shows a typical EMI isolation band consisting of one stripe which is produced by the non-pulsed energization of all styli.

FIG. 4 shows the printed output produced when two consecutive isolation bands are inserted after a preset number of have been printed.

DETAILED DESCRIPTION OF THE PREFERRED EMBODIMENT

Figure 1:
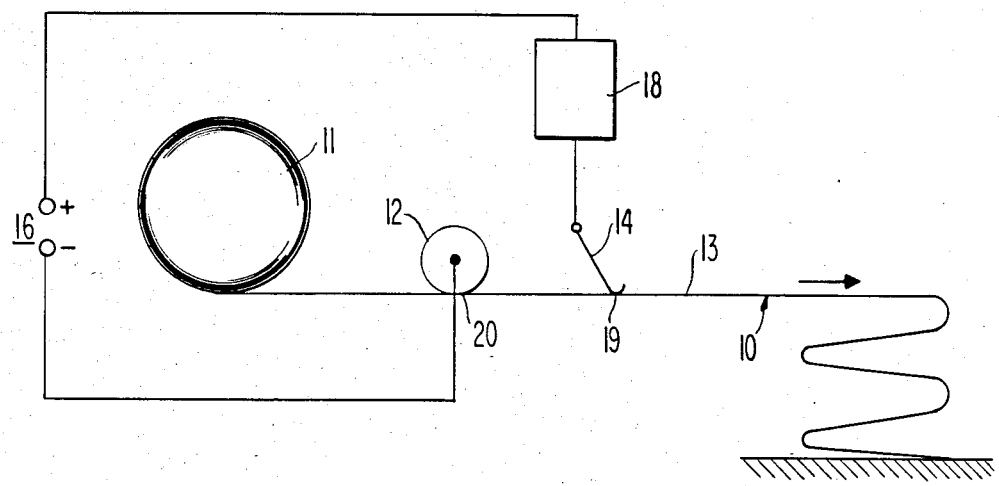
FIG. 1 shows the typical construction of an electrical discharge printer.

Referring to the drawings, FIG. 1 illustrates the typical construction of a prior art electrical discharge printer such as that used in the present invention. In such a printer, electrosensitive paper 10 is fed from a roll 11 via a feed wheel 12 past a stylus (or styluses) 14 which is in contact with the conductive surface of the electrosensitive paper 10. Means (not shown) are provided to mechanically move the stylus 14 across the width of the electrosensitive paper 10. In order to accomplish printing, an electrical circuit is formed from the positive terminal of d. c. power supply 16, through the electronic controls 18, then through the stylus 14 and to the conductive surface 13 of the electrosensitive paper 10 at point 19, back through the feed wheel 12 at point 20 and back to the negative terminal of power supply 16.

The energization of the stylus 14 by the electronic controls 18 actually burns away the metallization on the coated electrosensitive paper 10 because the contact between the stylus 14 and the metallization is essentially a high resistance compared to the remainder of the conductive path between the outputs of the power supply 16. As a result, almost all of the voltage drop is across the stylus 14 and the coated surface of the paper 10. The power due to this voltage drop is concentrated enough to actually cause the metallization on the surface 13 of the electrosensitive paper 10 to vaporize. When the metallization vaporizes, there is enough of an interruption in the circuit to cause a spark to occur.

As previously mentioned, the arcing at point 19 generates a broad band of electromagnetic energy which is conducted by the metallized surface 13 of the electrosensitive paper 10 acting as an antenna, thus producing the undesired electromagnetic interference. The electromagnetic energy is coupled right into the metallized coating 13 of the electrosensitive paper 10 and once on this coating 13, the electrosensitive paper 10 acts as an antenna due to its conductive nature. The energy radiates along the surface 13 of the previously printed paper 10 out of the printer enclosure and into the open air.

Typical of the electrosensitive paper utilized in an electrical discharge printer is that manufactured by Dennison Manufacturing Company and sold as type 38-001-0. Although such paper has some ohmic resistance and therefore is not a perfect conductor, it does provide a relatively good continuous conductor and therefore acts as a relatively good antenna.

In typical electrical discharge printers, such as those manufactured by SCI Systems, Inc., there are normally five to seven styluses 14, positioned vertically above one another, which are simultaneously scanned across the width of the paper. The height of the plurality of styluses 14 normally corresponds to the width of the characters to be printed. Thus as the styluses 14 scan across the width of the paper, a whole column of characters are printed. In many present electrical discharge printers and in that used in the preferred embodiment of the invention, the electrosensitive paper 10 is continuously fed as all of the styluses 14 are scanned across the width of the paper 10. Thus the wiping across the paper 10 is not at an exact right angle with respect to the edge of the paper 10. That is, there is a skew in the printed column produced because the paper 10 moves one pitch as the styluses 14 go from one edge of the paper 10 to the other.

As the length of printed electrosensitive paper 10 increases, the length of the antenna formed by the printed electrosensitive paper 10 increases and the energy radiated also increases in a similar fashion to a wire antenna in which the length of the wire is increased. Those skilled in the art will appreciate that if you cut an untuned antenna (i.e., shorten it), then the normal pattern of energy generated by the antenna is disturbed and the radiating efficiency is reduced, so there is a reduction in the amount of energy that is transmitted into the environment. If one were to again cut the previously cut sections of the untuned antenna, the amount of energy radiated would again be decreased. Thus, if you continually cut the untuned antenna into smaller and smaller sections, a point will be reached where there will no longer be much of an effective antenna. That is, the energy won't be radiated at all. In summary then, when one goes from an infinitely long untnuned antenna to a very short untuned antenna, the resultant energy transmitted into the environment goes from maximum radiation down to a negligible level.

Figure 6:
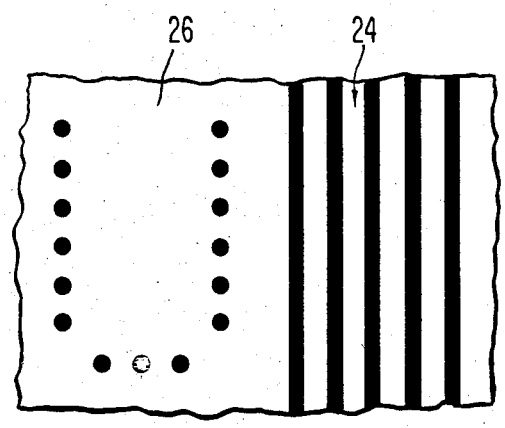
FIG. 6 is an enlarged view of a section of FIG. 3 showing a character formed by the selective pulsing of each stylus and a portion of an isolation band formed by the constant energization of all styluses as they scan across the width of the electrosensitive paper.

In the system of FIG. 1, the 14 styli are utilized in a pulse mode to form characters. As the styli 14 scan across the width of the electrosensitive paper 10, the control circuitry 18 pulses each stylus 14 at the point or points where it is desired to burn a small spot off the metallized layer 13 of the electrosensitive paper 10, thus forming a small dot. The combination of dots produced by the plurality of styluses 14 form characters in a very similar fashion to a matrix pin printer. Typical of the printing produced by this method is that shown in FIG. 6.

Figure 2:
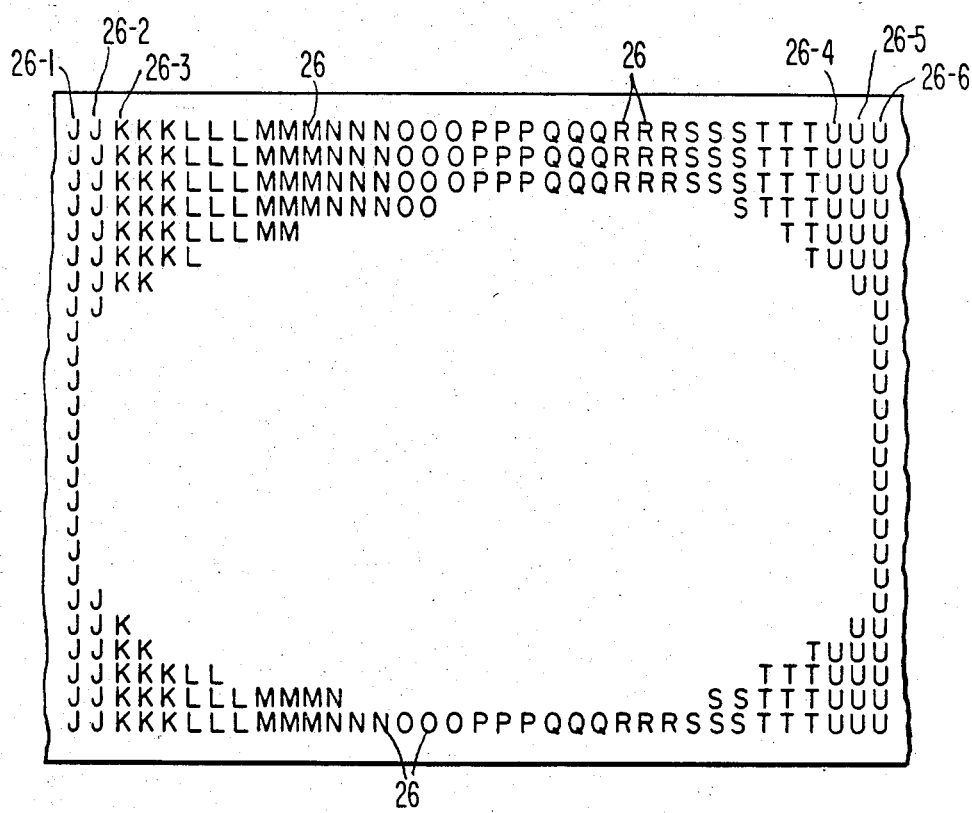
FIG. 2 illustrates typical printing produced by the prior art electrical discharge printer of FIG. 1.

Referring now to FIG. 2, although some of the metallization is burned off in forming the printed characters, there still is a good conductive path along the length of the printed electrosensitive paper 10 due to the fact that a good portion of the surface 13 of tne paper 10 is not burned off. Thus, as the paper 10 is printed, an antenna is created by the remaining continuous metallized surface on the printed paper 10.

As previously discussed, the length of the antenna and the amount of radiation generated into the atmosphere can be reduced by cutting the paper 10 into sections, thereby effectively shortening the length of the antenna. In the present invention, the paper 10 is not cut. Instead, the present invention acts to remove the metallization across the entire width of the paper 10 at predetermined intervals. By removing the metallization across the entire width of the paper 10, the effect is the same as if the paper 10 were physically cut. Thus, the conductive surface which forms the antenna is altered thereby shortening the effective length of the antenna. In the preferred embodiment of the present invention, the same styli 14 used for printing are utilized to produce EMI isolation bands 24 which effectively reduce the radiation generated through the metallized electrosensitive paper. In order to produce an EMI isolation band 24, the styluses 14 are not pulsed as in he case of normal printing. Instead, all of the styluses 14 are constantly energized as they scan across the width of the paper 10 in order to produce a continuous stripe of burned metallization across the entire width of the electrosensitive paper 10.

Figures 3, 4:
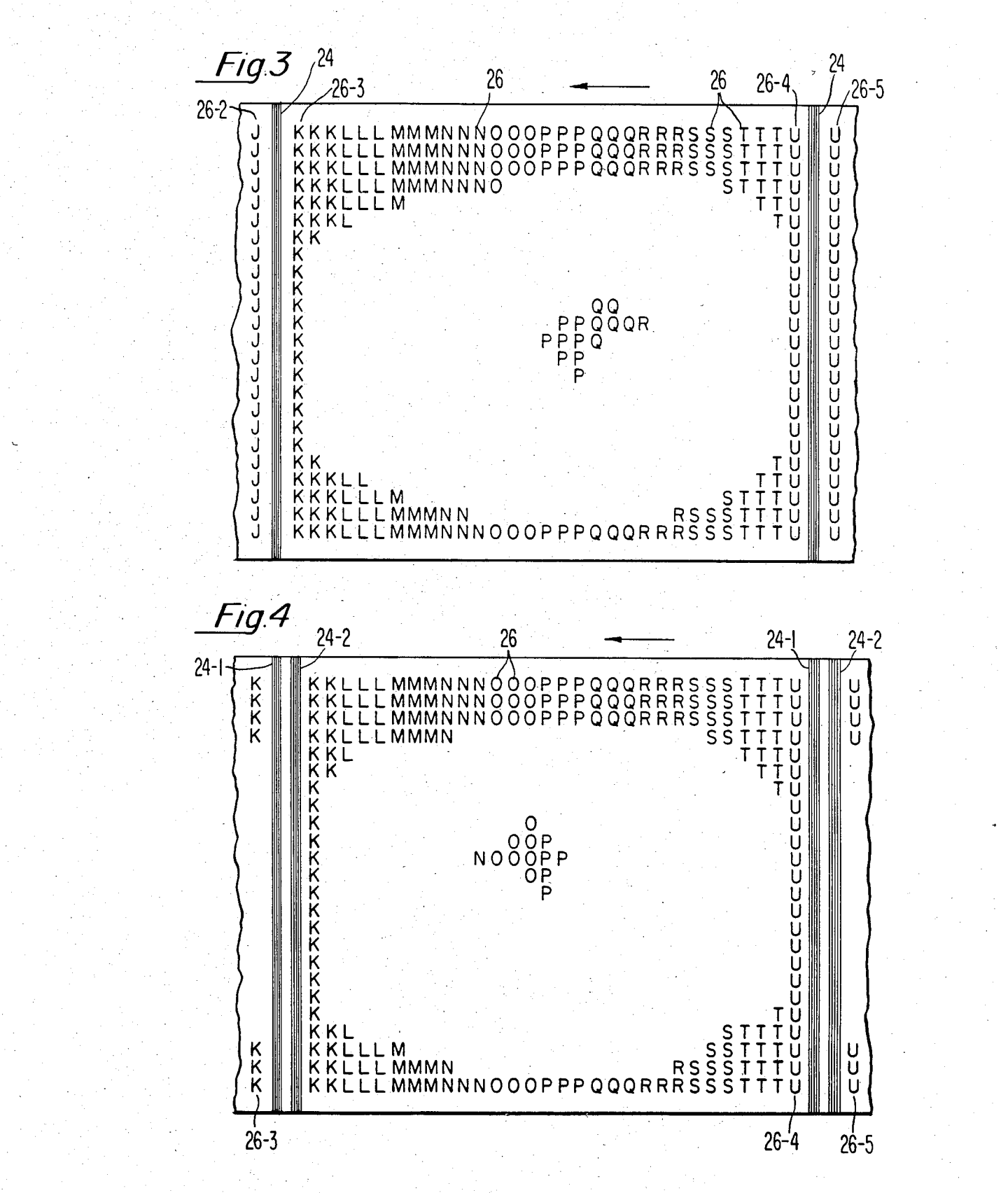

FIG. 3 illustrates a typical EMI isolation band 24 produced by the non-pulsed energization of all styli 14 as they scan across the width of the paper 10.

It has been found that the energy radiated by the printed electrosensitive paper 10 can be further reduced by generating more than one consecutive EMI isolation bands 24. FIG. 4 illustrates a printed output where two consecutive EMI isolation bands 24—1,2 are produced by the non-pulsed energization of all styli 14 as two consecutive columns are printed. The number of isolation bands 24 is related to the number of printed columns 26 between isolation bands 24. Thus approximately the same level of radiation is obtained using one isolation band 24 after each twenty columns 26 of printed text output, or two consecutive isolation bands 24 after fifty columns 26 or printed output, or three consecutive isolation bands 24 after ninety columns 26 or printed output. Still referring to FIG. 3, it should be noted that the distance between the consecutive isolation bands 24 is the same as the normal spacing between adjacent printed columns 26 of characters. This spacing is a consequence of the fact that the present invention does not require the printer's paper feeding mechanism to be modified. That is, no change is required in rhe rate at which paper 10 feeds during the operation which produces the EMI isolation bands 24. Although the preferred embodiment of the present invention produces isolation bands 24 by constantly energizing all styluses 14 as they scan across the width of the paper 10, various alternate embodiments of the system are available. THus for instance, it is quite easy to activate only one of the plurality of styluses 14 to create a finer isolation band 24. This, however, would require a nore frequency repetition of isolation bands 24. Another alternative is to utilize a printer which provides more styluses 14 than are required to print the width of a character. For example, assume that five styluses 14 are required to print a character but the printer includes a sixth, or sixth and seventh styluses 14. As each column of characters was printed, five adjacent styli would be pulsed in order to produce the column 26 of printed characters. However, the six or sixth and seventh styluses 14 would be constantly energized to produce an isolation band 24 adjacent to each column 26 of characters. It is submitted that the relatively thin isolation band produced by constantly energizing one stylus 14 would not be objectionable to the user and would not significantly detract from the print quality. In such a printer, it would not be necessary to additionally generate seperate isolation bands 24. Therefore, the effective output rate of the printer would not be lowered due to the time involved in printing separate isolation bands 24.

Another alternative to the primary embodiment of the present invention is to manufacture the electrosensitive paper 10 with "preprinted" isolation bands 24. This can easily be done during the manufacturing process by just not coating the paper with metallization at predetermined intervals along its length. Although such "preprinted" paper could be easily produced, the printers electronics would have to be modified in order for it to avoid attempting to print on a non-coated section of the electrosensitive paper 10. Those skilled in the art will appreciate that some type of a photo pickup could easily be utilized to synchronize the printer so that printing is not attempted at points along the length of the paper roll where an EMI isolation band 24 is present.

A third alternative to the primary embodiment of the invention is to only energize one or two of the styluses 14 and therefore create a finer isolation band 24. However, since the burning off of the metallization from the electrosensitive paper by constantly energizing a stylus 14 does not create a perfect electrical break across the width of the paper 10, the energy radiated by the paper 10 would not be reduced as much as if all of the styli 14 were constantly energized. As a consequence, the number of printed columns 26 between EMI isolation bands 24 would have to be reduced in order to maintain the same level of radiation into the environment.

Figure 5:
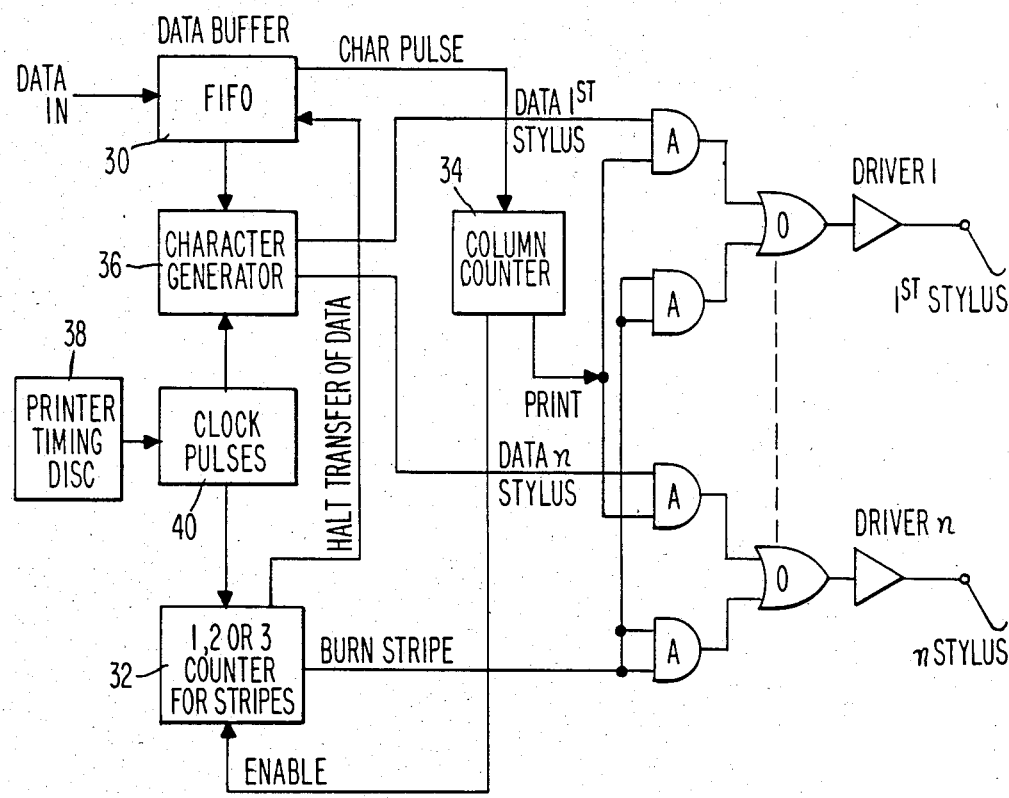
FIG. 5 is a functional block diagram illustrating a method of controlling an electrical discharge printer in order to produce EMI isolation bands in the printed output.

FIG. 5 illustrates in block diagram form a control circuit which can be used to control the generation of the EMI isolation bands 24. The circuit illustrated is particularly adapted for use in the Burroughs S3000 Document Sorting System. The S3000 system utilizes an SCI Model 1110 Rotary Printer as its output device. Those skilled in the art will readily appreciate that the control circuit illustrated may be easily adapted for use with any other type of system employing any of numerous brands of electrical discharge printers. The discussion to follow will describe the function of each element in generalized terms.

In the preferred embodiment, data is received from the S3000 system on the Data In line and enters the First In-First Out Buffer (FIFO) 30. Alternate control circuits may utilize a shift register or a plurality of flipflops in place of the data buffer 30.

The control circuit illustrated is a modification of the prior art circuit utilized in the S3000 system prior to it being modified for the printing of EMI isolation stripes 24. That is, if you eliminate the Counter For Stripes 32, the Column Counter 34, the ENABLE signal from column counter 34 to the Counter For Stripes 32, and the signal BURN STRIPE exiting from the counter for stripes 32, you are left with the control circuit utilized in the prior art S3000 system. That is, information would be processed without any burning of isolation bands 24 or halting of the FIFO 30.

Since an EMI isolation band 24 must be inserted after a certain number of columns 26 have been printed, the first thing that has to be done is to introduce the Column Counter 34 in order to keep track of how many columns 26 have been printed. When a predetermined number (set by programmable means, not shown) of columns 26 have been printed, the column counter 34 indicates that some number of EMI isolation bands 24 must be burned by issuing an enable signal to the counter for stripes 32. The counter for stripes 32 is set by a programmable switch (not shown) to specify the number of consecutive isolation bands 24 that are to be burned. Those skilled in the art will appreciate that these programmable functions may alternatively be accomplished by the system's software.

Upon receipt of the ENABLE signal at the counter for stripes 32, the next thing that must be done is to synchronize the control circuit so that clock pulses are coming in that control the rest of the system. In addition, the transfer of data that would normally be printed (instead of the stripes 24) must be halted. The transfer of data is halted by the counter for stripes 32 signalling the data buffer 30 to halt the transfer of data. Upon receipt of the Halt Transfer of Data signal at the data buffer 30, the data buffer 30 is stopped. Simultaneous with this signal, a Burn Stripe signal is generated by the counter for stripes 32. The halt transfer of data signal from the counter for stripes 32 will remain active for the time required to print one, two, or three isolation bands 24, after which the halt transfer of data signal will be deactivated and the system will be restored back to normal printing of data.

In the preferred embodiment, the data buffer 30 contains coded information corresponding to 32 characters. When it is half full (or half empty), the data buffer 30 signals the host system (S3000) to supply it with the next sequence of data. In the preferred embodiment, 24 characters are printed in each column 26 of data. As long as there is at least one character of data in the data buffer 30 when a printing operation is to occur, operation of the printer can proceed. Those skilled in the art will appreciate that the data buffer 30 is merely a source of data. The details of how the data buffer 30 is loaded is unimportant to the present invention.

The data buffer 30 is used to store code corresponding to the characters to be printed. The codes are fed into the character generator 36 which contains patterns describing which styluses 14 must be activated in order to print the dots which make up the characters. Thus, the character generator 36 serves to translate the code received from the data buffer 30 into a series of pulses defining the character to be printed. In a system employing five styli 14, the character generator 36 provides five output lines, one output line controlling each of the five styluses 14. Thus, the character generator 36 translates the code received from the data buffer 30 into the data necessary for each character so that the dots are burned at the right points to form the character to be printed. Such operation is quite similar to that employed in a dot matrix impact printer.

In the prior art control circuit, the signal "Burn Stripe" would normally be shorted to ground at all times. That is, that part of the action would normally be disabled and data would just flow through the control circuit. As modified, one line is lifted from ground which is effective to jam on the Burn Stripe signal solid, thereby eliminating any pulsing of the line.

The printer timing disk 38 provides synchronization between the styli 14 and the printing. It generates pulses depending upon its location so that the control circuitry can know where the disk 38 is. The printer timing disk 38 is part of the basic SCI printer. The printer timing disk 38 feeds a clock pulse generator 40 which provides timing for the character generator 36 and the counter for stripes 32. Details of the operation of the pulse generator 40 will be obvious to those skilled in the art.

The preferred embodiment of the control circuit (FIG. 5) is merely illustrative of one technique which may be utilized to control the generation of EMI isolation bands 24. Those skilled in the art will appreciate that variations on this design (dependent upon the type of printer being utilized) are readily available.

Having shown and described the preferred embodiment of the present invention, those skilled in the art will realize that various omissions, substitutions and changes in forms and details may be made without departing from the spirit of the invention. It is the intention, therefore, for the invention to be limited only as indicated by the scope of the following claims.

What is claimed is:

1. A method of operating an electrical discharge type printer in order to reduce the level of radiated electromagnetic emissions, said method comprising the steps of:
   a. printing a number of sequences of images between the longitudinal edges of a length of electrosensitive paper; and
   b. after printing said number of sequences, printing an isolation band extending across the entire width of said length of electrosensitive paper.

2. The method in accordance with claim 1 further including the step of returning to said step a after printing said isolation band.

3. The method in accordance with claim 1 further including the step of longitudinally incrementing said length of paper after printing each one of said sequences and each one of said isolation bands.

4. The method in accordance with claim 3 further including the step of continuously longitudinally incrementing said length of paper during the printing of each of said sequences and each of said isolation bands.

5. The method in accordance with claim 1 wherein said electrical discharge type printer includes a plurality of styluses which move between the longitudinal edges of said length of electrosensitive paper, and wherein said isolation band is produced by constantly energizing at least one of said plurality of styluses as said plurality of styluses move between the longitudinal edges of said paper.

6. The method in accordance with claim 5 wherein each one of said plurality of styluses is pulsed with a voltage at each point where one of said sequences is to be printed.

7. The method in accordance with claim 5 further including the step of printing a second isolation band immediately after printing said previously mentioned isolation band.

8. The method in accordance with claim 5 wherein said isolation band is produced by constantly energizing all of said styluses as said plurality of styluses nove between the longitudinal edges of said paper.

9. The method in accordance with claim 5 wherein said plurality of styluses are closely spaced in a straight line parallel to the longitudinal edges of said length of paper.

10. The method in accordance with claim 5 wherein said length of paper is fed from a roll.

11. The method in accordance with claim 7 further including the step of increasing the number of sequences of images printed between the printing of said two consecutive isolation bands.

12. In combination with an electrical discharge printing apparatus of the type utilizing a spark mechanism to accomplish printing of images on an electrosensitive paper, including at least one stylus, means for moving said at least one stylus across the width of said paper, means for selectively applying a voltage between said paper and said at least one stylus, and means for feeding said paper past said at least one stylus to position said paper to print a next line, the improvement which comprises:
   means, responsive to having printed a number of lines, for printing a continuous isolation band across the entire width of said paper.

13. The printing apparatus in accordance with claim 12 wherein said isolation band printing means includes means for constantly energizing said at least one stylus as it moves across the entire width of said paper.

14. The printing apparatus in accordance with claim 13 wherein said isolation band printing means further includes:
   means for counting the number of said lines printed since one of said isolation bands was last printed;
   means, responsive to a preset number of said lines having been printed since one of said isolation bands was last printed, for halting the printing of said images and printing at least one of said isolation bands; and
   means, responsive to having printed one of said isolation bands, for continuing the printing of said images.

15. A method of operating an electrical discharge printing apparatus of the type utilizing a spark mechanism to accomplish printing on a length of coated electrosensitive paper, said apparatus including at least one stylus, said method including the steps of feeding said paper longitudinally past said at least one stylus, moving said at least one stylus across the entire width of said paper and selectively applying a voltage between said paper and said at least one stylus, the improvement comprising the additional step of periodically continuously applying said voltage between said at least one stylus and said paper as said at least one stylus is noved across the entire width of said paper, whereby a line of the coating across the entire width of said paper is removed.

16. A method of operation an electrical discharge type printing apparatus, said printing apparatus including a plurality of styluses which scan across the width of a length of electrosensitive paper, each one of a subset of said plurality of styluses energized with a voltage each time an image is to be printed on the paper at a point corresponding to the respective location of said each one of a subset of said plurality of styluses, wherein at least one of said plurality of styluses is constantly energized as it scans across the width of said paper, whereby an isolation band is printed across the width of the paper adjacent to each one of said images printed.

17. The method in accordance with claim 1 wherein said number of sequences of images is a predetermined number.

18. The method in accordance with claim 1 wherein said isolation band extends continuously across the entire width of said length of electrosensitive paper.

19. The method in accordance with claim 1 wherein:
   said number of sequences is a predetermined number; and
   said isolation band extends continuously across the entire width of said length of electrosensitive paper.

20. A method of operating an electrical discharge type printer comprising the steps of:
   a. printing a number of sequences of images between the longitudinal edges of a length of electrosensitive paper; and b. after printing said number of sequences, printing a continuous isolation band between the longitudinal edges of said length of electrosensitive paper.

21. The method in accordance with claim 20 wherein said number of sequences is a predetermined number.

22. The method in accordance with claim 2 further including the step of continuously longitudinally incrementing said length of paper during the printing of each of said sequences and each of said isolation bands.

23. The method in accordance with claim 5 wherein said plurality of styluses move across the entire width of said length of electrosensitive paper.

24. The method in accordance with claim 8 wherein said plurality of styluses move across the entire width of said length of electrosensitive paper.

25. The apparatus in accordance with claim 12 wherein said number of said lines is a predetermined number.

26. The apparatus in accordance with claim 13 wherein said means for feeding said paper includes means for continuously feeding said paper past said at least one stylus.

27. The apparatus in accordance with claim 13 wherein said isolation band printing means includes means, responsive to having printed a number of said lines, for printing multiple successive and continuous isolation bands across the entire width of said paper.

28. The apparatus in accordance with claim 13, including a plurality of styluses arranged in a line parallel with the length of said paper, wheein said means for moving said at least one stylus includes means for moving said plurality of styluses across the entire width of said paper, and wherein said isolation band printing means includes means for constantly energizing all of said plurality of styluses as they scan across the entire width of said paper.

29. The method in accordance with claim 15 wherein said at least one stylus includes a plurality of styluses.

30. The method in accordance with claim 15 wherein said periodic continuous voltage application is responsive to the distance said paper is fed longitudinally past said at least one stylus.

31. The method in accordance with claim 15 further including the step of continuously feeding said paper longitudinally past said at least one stylus.

32. The method in accordance with claim 15 further including the additional step, after continuously applying said voltage between said at least one stylus and said paper as said at least one stylus is scanned across the entire width of said paper, of immediately repeating the latter step.

33. The method in accordance with claim 16 wherein said at least one of said plurality of styluses is excluded from said subset.

34. The method in accordance with claim 16 further including the step of continuously transporting said paper longitudinally past said plurality of styluses.

35. The method in accordance with claim 16 wherein said plurality of styluses are closely spaced in a straight line parallel to the longitudinal edges of said length of paper.

* * * * *